United States Patent [19]

Mazurkiewicz

[11] Patent Number: 5,148,728
[45] Date of Patent: Sep. 22, 1992

[54] HIGH PRESSURE LUBRICOOLING MACHINING OF METALS

[75] Inventor: Marian Mazurkiewicz, Rolla, Mo.

[73] Assignee: The Curator of the University of Missouri, Columbia, Mo.

[21] Appl. No.: 754,402

[22] Filed: Sep. 3, 1991

Related U.S. Application Data

[63] Continuation of Ser. No. 518,988, May 4, 1990, abandoned, which is a continuation of Ser. No. 242,554, Sep. 12, 1988, abandoned.

[51] Int. Cl.$^5$ .................. B23B 1/00; B23B 27/10; B23B 27/22
[52] U.S. Cl. .................................. 82/1.11; 407/11; 408/57; 408/60
[58] Field of Search .................. 407/11; 82/1.11; 408/57-61

[56] References Cited

U.S. PATENT DOCUMENTS

| | | | |
|---|---|---|---|
| 2,653,517 | 9/1953 | Pigott | 90/11 |
| 2,785,457 | 3/1957 | Pigott | 29/106 |
| 2,848,790 | 8/1958 | McMann | 29/106 |
| 3,002,410 | 10/1961 | Lee | 82/24 |
| 3,702,740 | 11/1972 | Pettigrew | 408/56 |
| 3,874,808 | 4/1975 | Zaccardelli et al. | 408/1 |
| 4,302,135 | 11/1981 | Lillie | 408/59 |
| 4,322,992 | 4/1982 | Remillard et al. | 82/34 |
| 4,621,547 | 11/1986 | Yankoff | 82/1.11 |

FOREIGN PATENT DOCUMENTS

0127904  7/1985  Japan ..................... 407/11

OTHER PUBLICATIONS

R. Pigott and A. Coldwell; Hi-Jet System for Increasing Tool Life; S & E Quarterly Transactions (vol. No. 3 1952, p. 547).

Author: Sharma et al.; Title: Some Effects of Injecting Cutting Fluids Into the Chip-Tool Interface; Publication; Journal of Engineering for Industry; Date: May, 1971 pp. 441-444.

*Primary Examiner*—Bruce M. Kisliuk
*Assistant Examiner*—Jack Lavinder
*Attorney, Agent, or Firm*—Senniger, Powers, Leavitt & Roedel

[57] ABSTRACT

A method of machining metals, by effecting relative movement between a work piece and a tool having a cutting edge to cut the work piece and produce a chip, including injecting a high pressure jet of cooling liquid into the cutting zone during machining, the jet being at a pressure of at least about 5,000 p.s.i. The jet is preferably injected between the chip and the rake face of the cutting tool, and the trajectory of the jet is offset from the rake face of the cutting tool by a small amount and the jet is aimed at the cutting edge of the tool.

6 Claims, 2 Drawing Sheets

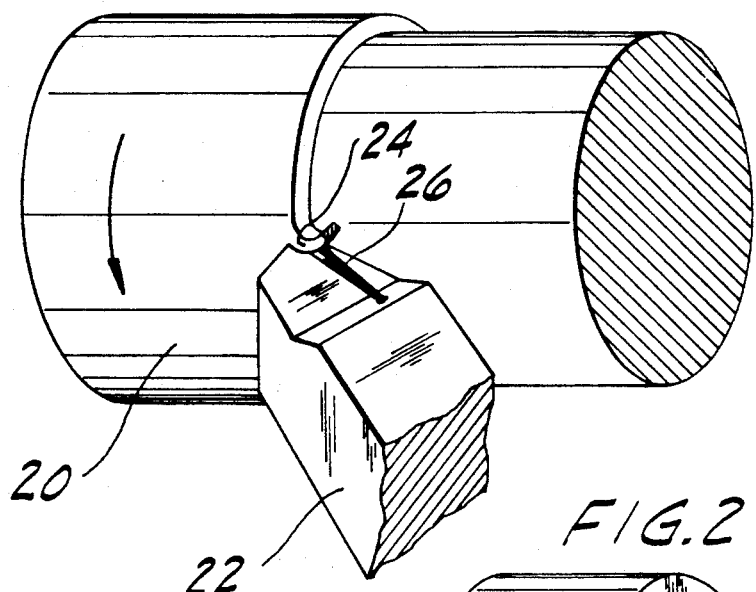
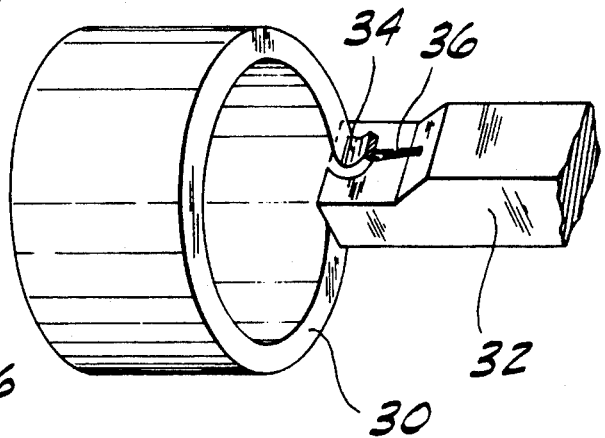
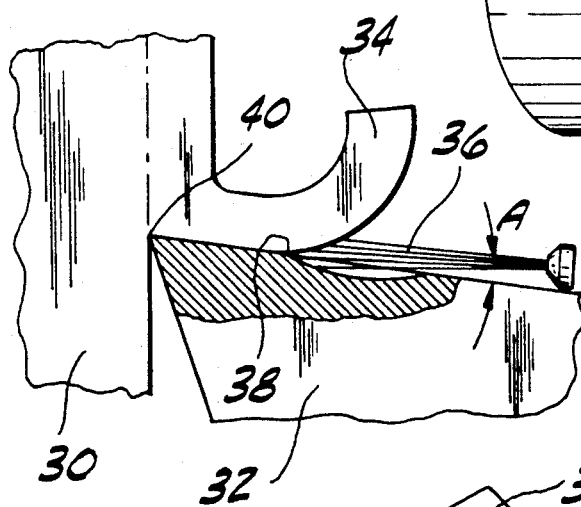
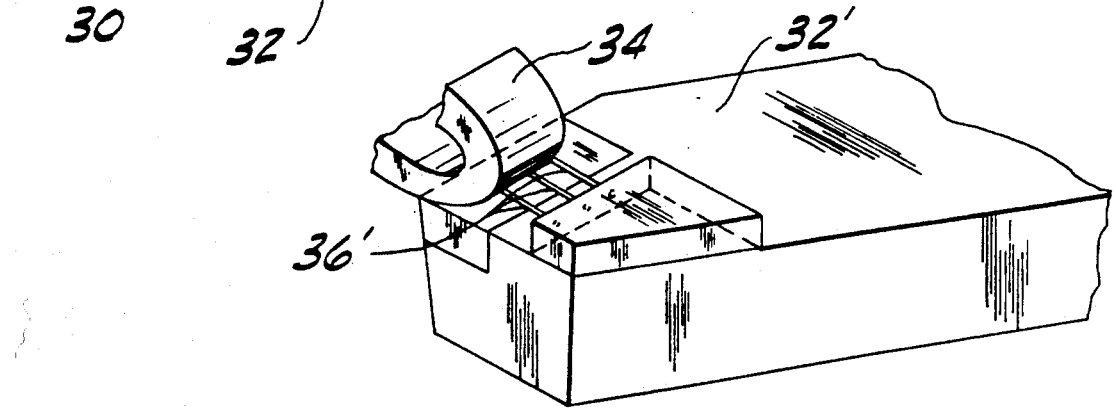

HIGH PRESSURE LUBRICOOLING MACHINING OF METALS

This is a continuation of application Ser. No. 07/518,988, filed May 4, 1990, which was a continuation of application Ser. No. 07/242,554, filed Sept. 12, 1988, both are now abandoned.

BACKGROUND OF THE INVENTION

This invention relates to the machining of metals, and in particular to an improved method of cooling and lubricating the cutting zone during machining.

The machining of metals, such as with a lathe, generates significant amounts of heat which impairs the cutting action of the tool. It was recognized early on that cooling the metal during cutting would improve cutting and extend tool life. With the high speed machining techniques now in use, some type of cooling is virtually essential. This cooling is typically accomplished by a method known as "overhead flooding" in which a relatively large quantity of cooling fluid is flooded over the cooling zone at relatively low speed and pressure. Often the cooling fluid simply flows under gravity.

Lubricants, such as mineral oils, are usually added to the cooling fluid to reduce friction in the cutting zone; however, these added lubricants make disposal of the used cooling fluid more difficult. With anywhere from 2.5 to 5 gallons of coolant liquid used per pound of metal removed, this disposal can pose a difficult problem.

In the early 1950's it was discovered that applying water under low to moderate pressure to the cutting zone improved cutting and extended tool life. An article by Piggott and Collwell, entitled "Hi-jet System for Increasing Tool Life," 6 SAE Quarterly Transactions 547 (1952), incorporated herein by reference, disclosed that injecting a stream of coolant such as water under moderate pressure of about 400 p.s.i. (2.76 MPa) between the tool face and the cut surface dramatically improved tool life. It was further disclosed that there was a very distinct critical pressure above which tool life actually decreased. It was hypothesized that at higher pressures the cooling liquid swept the surface too fast, reducing heat transfer.

As a result of this early work, lubricooling jets have generally been restricted to pressures below about 400 p.s.i. (2.76 MPa) and it was not expected that jets of higher pressures would be effective in lubricating or cooling the cutting zone.

Even with the presently available lubricating and cooling techniques, the temperature and pressure and friction in the cutting zone are high and thus tool life is relatively short, cutting forces are high, material removal rates are low, and surface quality is generally poor. A particular problem with the more difficult to machine materials is chip formation—the resulting chips are long and straight and ribbon-like. These chips can interfere with machining so chip breakers must be incorporated in the tool. These chip breakers increase cutting force, and are themselves subject to severe wear, which shortens tool life.

SUMMARY OF THE INVENTION

Generally, the method of machining according to the principles of the present invention comprises injecting a high pressure jet of cooling fluid into the cutting zone. In particular the jet is injected between the chip and the rake face, and is preferably offset from the rake face by a small amount and aimed at the cutting edge of the tool. In comparisons with the prior art cooling methods, this method reduces the X-, Y-, and Z- components of the cutting force, and the coefficient of friction, and improves chip quality by forming segmented as opposed to ribbon-like chips, with smoother surfaces, for a given cutting speed and rake angle.

BRIEF DESCRIPTION OF THE DRAWINGS

FIG. 1 is a schematic view of regular machining employing a high pressure lubricooling jet according to the principles of this invention;

FIG. 2 is a schematic view of orthogonal machining employing a high pressure lubricooling jet according to the principles of this invention;

FIG. 3 is an enlarged schematic view of orthogonal machining employing multiple high pressure lubricooling jets according to the principles of this invention;

FIG. 4 is an enlarged cross sectional view of the tool/chip interface in the orthogonal machining shown in FIG. 2, showing the position of the high pressure lubricooling jet;

Corresponding parts indicate corresponding reference numerals throughout the several views of the drawings.

DETAILED DESCRIPTION OF THE PREFERRED EMBODIMENT

Figure 5:
FIG. 5 is photograph of chips formed by orthogonal machining with the prior art overhead cooling method.

The method of machining metal according to the present invention is illustrated schematically in FIGS. 1-4. The present method is applicable to all types of metal machining including turning, drilling, milling and shaping. FIG. 1 illustrates the regular cutting of a work piece 20 with a tool 22. The work piece 20 is rotated and the tool 22 applied against the work piece to remove a chip 24. A high pressure jet 26 of lubricoolant is directed between the tool face and the chip 24 being formed. FIG. 2 illustrates orthogonal cutting of a work piece 30 with a tool 32. The work piece 30 is rotated and the tool 32 applied against the work piece to remove a chip 34. A high pressure jet 36 of lubricoolant is directed between the tool face and the chip 34 being formed. FIG. 3 illustrates orthogonal cutting of a work piece with a tool 3240 in which multiple high pressure jets 36' of lubricoolant are directed between the tool face and the chip 34' being formed.

FIG. 4 shows the cutting zone in orthogonal cutting in which the high pressure jet 36 is directed between the rake face 38 of tool 32 and the chip 34 being cut from the work piece 30. The trajectory of the stream of the jet 34 is offset from the rake face 38, forming an angle A with the rake face 22, and is aimed at the cutting edge 40 of the tool 34. This angle A is preferably between about 0° and 6°.

The high pressure cooling according to the method of the present invention during orthogonal machining was compared to orthogonal machining without cooling, to machining with overhead cooling, and to orthogonal machining with axiparallel cooling. The tests were carried out on a screw-cutting lathe powered by a 3.8 kW electric motor, and having a spindle speed of between 120 and 1500 rpm and a feed rate of 0.02 to 0.4 mm/rev. The tests were conducted on 43.3/36.5 mm pipe made of UNS 1020 steel, which is representative of a difficult to machine material. It should be understood that the method was employed on UNS 1020 for illustration purposes only, and the method is not in any way limited to this material.

A tool with a 10° rake angle was used in the testing. The Z-component and X-components of the forces were measured using a Kistler type 9265 Al dynamometer.

The high pressure water jet was generated with a 280 MPa, 3.7 l/min pump. The water jet was supplied to the cutting area through high pressure tubing formed as a helical coil to provide sufficient flexibility in the supply line to compensate for the travel of the tool carriage during machining. Standard tap water was used. The water was filtered (5 microns), but no additives were required or used. This allowed the water to be used in a open circuit, and eliminated the need for a recirculation and filtration system. The jet was provided though a 0.25 mm orifice, resulting in a fluid consumption of 2.25 l/min. In contrast, the fluid consumption for the conventional cooling systems in the test was approximately 15 l/min.

The Z- and X- components of the cutting force from orthogonal machining were measured and the coefficient of friction was calculated for the present method and the three prior art methods at lineal speeds of 18 m/min, 36 m/min and 180 m/min. The results are shown in TABLES I, II, and III:

TABLE I

| | COMPARISON DATA FOR 18 m/min | | | |
|---|---|---|---|---|
| | HIGH PRESSURE COOLING | WITHOUT COOLING | OVERHEAD COOLING | AXIPARALLEL COOLING |
| Z- FORCE (N) | 1010 | 1550 | 1500 | 1550 |
| X- FORCE (N) | 150 | 800 | 700 | 750 |
| COEFFICIENT OF FRICTION | 0.35 | 0.75 | 0.675 | 0.7 |

TABLE II

| | COMPARISON DATA FOR 36 m/min | | | |
|---|---|---|---|---|
| | HIGH PRESSURE COOLING | WITHOUT COOLING | OVERHEAD COOLING | AXIPARALLEL COOLING |
| Z- FORCE | 1010 | 1425 | 1400 | 1350 |
| X- FORCE | 200 | 800 | 750 | 725 |
| COEFFICIENT OF FRICTION | 0.4 | 0.8 | 0.75 | 0.75 |

TABLE III

| | COMPARISON DATA FOR 180 m/min | | | |
|---|---|---|---|---|
| | HIGH PRESSURE COOLING | WITHOUT COOLING | OVERHEAD COOLING | AXIPARALLEL COOLING |
| Z- FORCE | 1150 | 1525 | 1500 | 1575 |
| X- FORCE | 325 | 775 | 775 | 750 |
| COEFFICIENT OF FRICTION | 0.5 | 0.725 | 0.75 | 0.7 |

It is apparent from Tables I, II, and III, that the feed forces (X- FORCES) are substantially the same for the three prior art methods of machining, while the feed forces for the high pressure cooling are reduced by more than 50%. The cutting forces (Z- FORCES) involved using high pressure cooling are also reduced by about 23. The coefficient of friction along the tool/chip interface, as calculated from the measured feed and cutting forces, is also reduced using the high pressure cooling of the present invention.

Table IV indicates the effect of the rake angle on the cutting forces and coefficient of friction using the high pressure cooling of the present invention.

TABLE IV

| DATA FOR VARYING RAKE ANGLES | | | |
|---|---|---|---|
| 180 m/min., 0.4 mm/rev, 280 MPa, 0.25 mm nozzle | | | |
| | −10° | 0° | +10° |
| Z-FORCE | 1500 | 1450 | 1250 |
| X-FORCE | 950 | 700 | 450 |
| COEFFICIENT OF FRICTION | 0.4 | 0.45 | 0.5 |

It is apparent from Table IV that as the rake angle increases, the feed and cutting forces (X- and Z- forces) diminish, while the coefficient of friction increases only slightly.

The magnitude of the feed and cutting force components and the coefficient of friction along the tool/chip interface depend upon the injection pressure and the nozzle diameter. The cutting force components and the coefficient of friction both diminished continuously as the injection pressure increased from 70 MPa to 280 MPa, and as the nozzle diameter increased from 0.135 mm to 0.35 mm. The inventor believes that this may be attributed to the deeper penetration of the jet into the tool interface with increased pressure and jet diameter. The inventor also believes that the jet acts to lift the chip up, thereby reducing the area of contact between the chip and tool.

It was also observed that the quality of the chip formed using the high pressure cooling was greatly improved. It is significant to note in this regard that during the machining of metal, the primary energy consumption is in the formation and movement of the chip. Thus metal removal rate is of primary concern.

Figure 7:
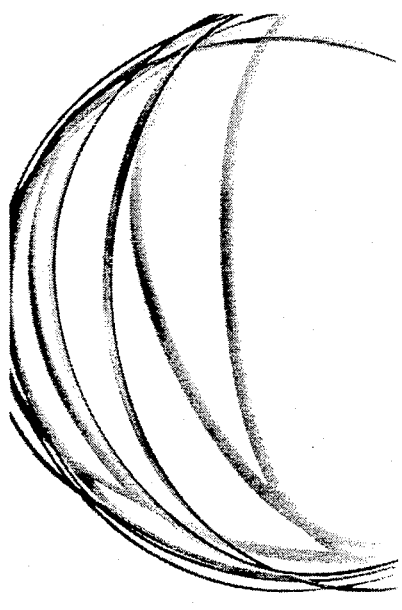
FIG. 7 is photograph of chips formed by orthogonal machining with the high pressure lubricooling according to the present invention.

However, chip shape is also an important consideration. FIG. 5 illustrates the continuous ribbon type chip chips formed from orthogonal machining of UNS 1020 with overhead cooling. FIG. 7 illustrates the segmented type chip formed from orthogonal machining of UNS 20 with the high pressure lubricooling of the present invention.

The cutting parameters are generally selected to achieve formation of a segmented-type chip (FIG. 7), as opposed to a continuous ribbon-like chip (FIG. 5). When such parameter selection is not possible, a chip breaker is employed. For each of the prior art machining methods, segmented chips can only be formed over well defined ranges of cutting speed and feed rate, and machining outside of these ranges will result in the formation of continuous or ribbon-like chips. For example, at a lineal cutting speed of 180 m/min and a feed rate of 0.4 mm/rev., as reported in Table III, formation of segmented chips is only possible with the high pressure cooling according to the present invention. The inventor believes that this is made possible by a reduction in the coefficient of friction along the tool/chip interface. As a result of this reduction the shear plane angle increases, thus leading to a reduction in the chip compression factor. It is this change in the chip compression factor that is believed to promote the observed chip-breaking effect. Comparing the maximum material removal rate that still allows for the formation of segmented type chips, the rates of material removal for high pressure cooling according to the present invention is 12.5 times higher than that for dry cooling, and 6.25 times higher than that for overhead or axiparallel cooling. It should be noted that even higher removal rates are possible with the high pressure cooling according to the present invention, but the testing was limited by the capability of the experimental apparatus. FIGS. 5 and 7 illustrate that all other conditions remaining equal, the high pressure lubricooling jet of the present invention promotes the formation of the more desirable segmented-type chips shown in FIG. 7, where the prior art methods of cooling result in the formation of the less desirable ribbon-type chips shown in FIG. 5.

Figure 6:
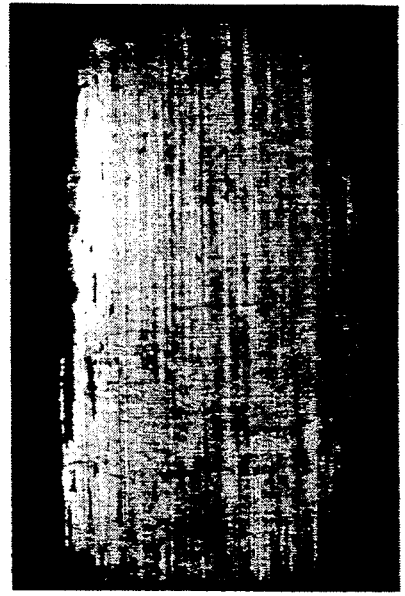
FIG. 6 is a photomicrograph of the surface of the chips shown in FIG. 5.
Figure 8:
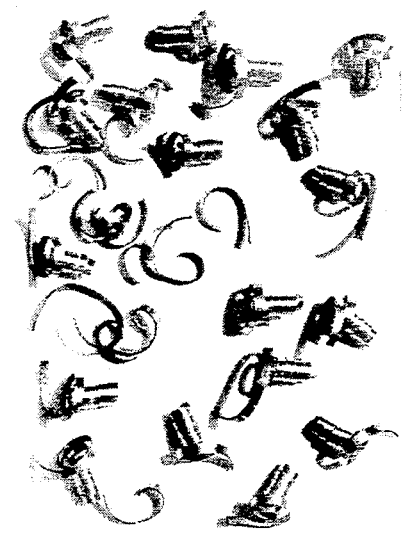
FIG. 8 is a photomicrograph of the surface of the chips shown in FIG. 7.

The quality of the chip surface was also improved with the present invention. Microscopic examination of the chip contact surface for the cases studied shows that conditions of seizure existed at the tool/chip interface in each of the prior art methods of machining. However, such examination indicates that high pressure cooling according to the method of the present invention produces a smooth surface indicating sliding conditions on the tool/chip interface. FIG. 6 illustrates the rough chip surface resulting from the seizure conditions at the tool/chip interface under the prior art overhead cooling methods. FIG. 8 illustrates the smoother chip surface resulting from the reduction or elimination of the seizure conditions at the tool/chip interface under the high pressure lubricooling according to the present invention.

The effectiveness of the cooling is also indicated by the reduction of the chip temperature coming off the tool as compared to the prior art methods of machining.

The inventor has experimentally determined that beneficial effects are observed with jet pressures of 5,000 p.s.i. and more particularly with pressure, of at least 10,000 p.s.i.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An improved method of machining metals, by effecting relative movement between a work piece and a tool having a cutting edge and a rake face extending generally rearwardly from the cutting edge, the cutting edge being in contact with the work piece thereby to cut the work piece resulting in the production of a chip engaging the tool along an interface having a leading edge generally rearward of the cutting edge, the improvement comprising the step of injecting a high pressure jet of lubricooling liquid into the interface generally between the leading edge of the chip and the tool during machining, the pressure of the jet being sufficient to cause the liquid to penetrate between the chip and the rake face of the tool and to flow along the interface from the leading edge of the chip into a cutting zone of the interface closely adjacent the cutting edge of the tool for lubricooling the workpiece and the tool, the jet originating from an orifice located outside the interface and being directed generally forwardly at the leading edge of the interface, the jet being at a pressure of at least about 5,000 p.s.i.

2. The improved method according to claim 1 wherein the jet is injected between the chip and the rake face of the cutting tool.

3. The improved method according to claim 2 wherein the trajectory of the jet is offset from the rake face of the cutting tool by a small amount and the jet is aimed at the cutting edge of the tool.

4. The improved method according to claim 3 where the trajectory of the stream of the jet is offset from the rake face by an angle of between about 0° and 6°.

5. The improved method according to claim 1 wherein the jet has a diameter of between about 0.004 inches and 0.020 inches.

6. An improved method of machining metals by effecting relative movement between a work piece and a tool having a cutting edge and a rake face extending generally rearwardly of the cutting edge, the cutting edge contacting the work piece thereby to cut the work piece resulting in the production of a chip engaging the rake face along an interface having a leading edge generally rearward of the cutting edge, the improvement comprising, directing a jet of lubricooling liquid forward toward the cutting edge from a nozzle located outside the interface and rearward of the cutting edge such that the jet engages the chip and the tool rake face at the leading edge of the interface forward of the nozzle, the jet having a pressure of at least about 5,000 p.s.i. and being of sufficiently high pressure to force coolant into the interface between the chip and the rake face at the leading edge of the interface and into a cutting zone of the interface closely adjacent the cutting edge.

* * * * *